UNITED STATES PATENT OFFICE.

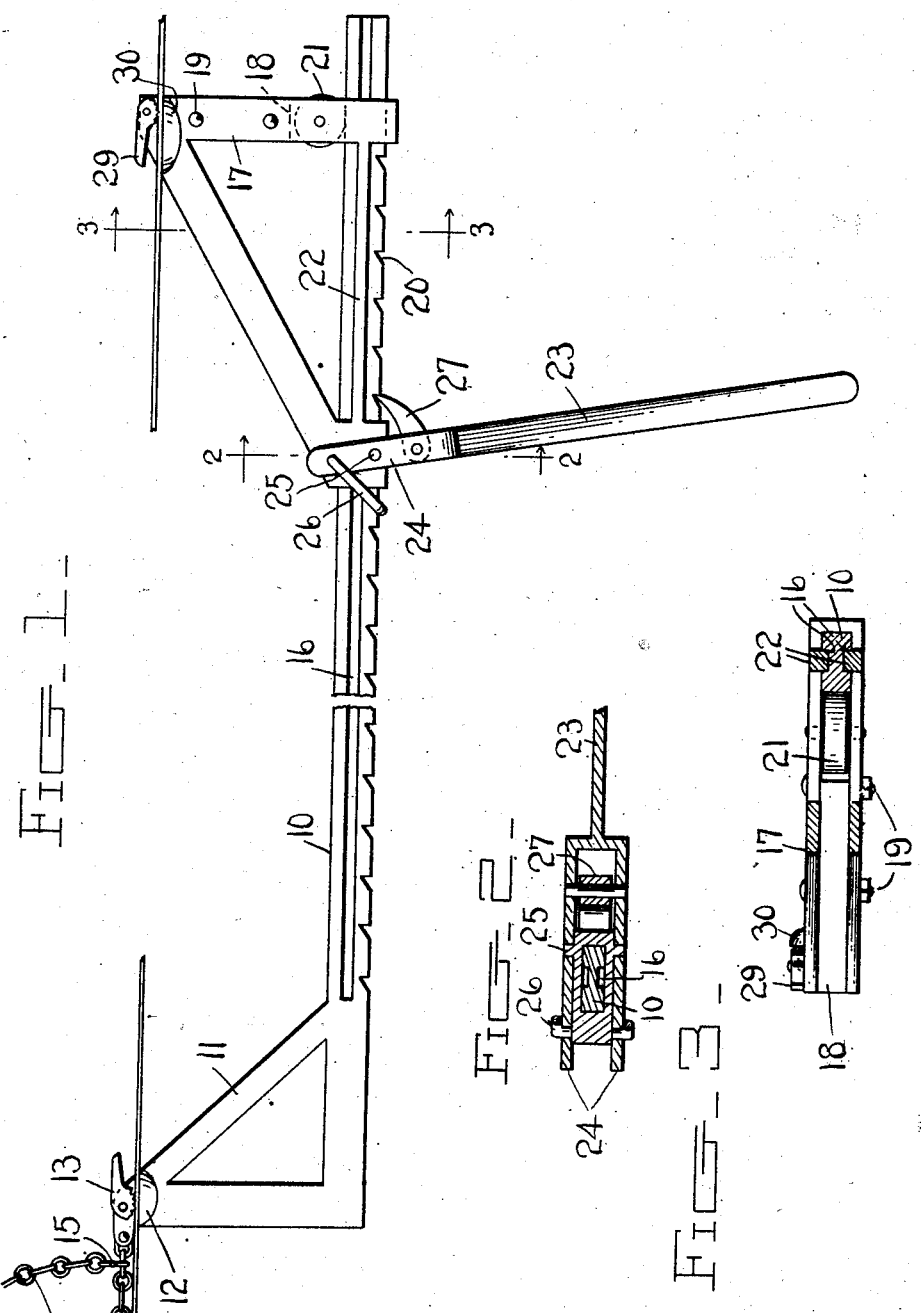

ADOLPH A. BOE, OF IRENE, SOUTH DAKOTA.

WIRE-STRETCHER.

974,228.  Specification of Letters Patent.  Patented Nov. 1, 1910.

Application filed April 22, 1908. Serial No. 428,526.

*To all whom it may concern:*

Be it known that I, ADOLPH A. BOE, a citizen of the United States, residing at Irene, in the county of Yankton, State of South Dakota, have invented certain new and useful Improvements in Wire-Stretchers; and I do hereby declare the following to be a full, clear, and exact description of the invention, such as will enable others skilled in the art to which it appertains to make and use the same.

This invention relates to wire stretchers and more particularly to that class which are designed for use in stretching the line wires of a wire fence.

In carrying out my invention, I have in view the provision in a wire stretcher of that specific class comprising a rack bar, wire clamping means at one end of the bar, a wire clamp slidable upon the bar, and a lever pivoted to the wire clamp, two pawls which are connected to the lever, one pawl acting, when the lever is moved in one direction, to shift the clamp upon the rack bar and the other pawl acting, when the lever is moved in the other direction, to further shift the clamp in the same direction as first shifted. By providing such means, the clamp is advanced upon the rack bar at each movement of the lever whereas in the ordinary constructions of wire stretchers of this class, two movements of the lever are necessary in order to advance the clamp one step.

In the accompanying drawings, Figure 1 is a side elevation of the stretcher embodying my invention showing the manner in which it is used. Fig. 2 is a section on the line 2—2 of Fig. 1. Fig. 3 is a section on the line 3—3 of Fig. 1.

As shown in the drawing, the wire stretcher embodying my invention comprises a rack bar indicated by the numeral 10 and formed at one end with a laterally direct integral extension 11. This extension 11 is formed at its outer end with a shoulder 12 and pivoted to the extension at its end is a cam wire gripping element 13 which coöperates with said shoulder in holding a fence wire between it and the shoulder. A chain 14 is connected to the said outer end of the extension 11 and this chain is engageable around a fence post and is provided at its extremity with a hook 15 which, after the chain has been engaged, is engaged with one of the links of the chain to hold the chain in place.

The rack bar 10, of the device, is formed in its sides with groove 16 and slidable upon the rack bar is a frame which is preferably stamped of sheet material and is bent upon itself to form two spaced parallel substantially triangular side portions 17 which are braced in their parallel relation by means of an intermediate filling piece 18 which is disposed between the two side members 17 and through which and the said side members are passed bolts 19. The rack bar 10 is formed in its outer edge with notches 20 and journaled between the side members 17 of the triangular frame above described is a roller 21 which travels along the inner edge of the said rack bar. Each of said side members 17 of the frame is formed with an integral side bar or rib 22, and these ribs travel in the grooves 16 in said rack bar as the frame is moved therealong.

The operating or jacking lever of the device is indicated by the numeral 23 and is formed at one of its ends with a yoke 24 in which yoke is received the acute corner of the triangular frame heretofore described, the said frame being provided at its said corner with pivot studs 25 which engage in openings formed in the arms of the yoke 24 of the lever and serve to pivot said lever to the frame for oscillatory movement as can be readily understood. Pivoted to the yoke 24 of the lever at its end, is a yoke-shaped pawl 26, the side portions of which extend to opposite sides of the rack bar and the frame slidable thereon, the connecting portion of the pawl being engageable with the notches 20. Another pawl 27 is pivoted between the arm 24 of the yoke end of the lever, and this pawl also coöperates with the notches 20 in the rack bar, as will now be explained.

As is clearly shown in the drawings, operation of the lever in one direction, for example to the right, will serve to bring a pushing force to bear against the pawl 27, the said pawl being engaged at its end in one of the notches 20 in the rack bar. This pushing force is resolved into a right line movement of the frame upon the rack bar in the direction of the laterally direct-extension 11 at the end of the rack bar. At the same time, the yoke pawl 26 is moved into engagement with one of the notches 20, and upon operating the lever toward the left, a pull is exerted upon this pawl to further move the frame in the direction stated, and to bring the pawl 27 into engagement with another one of the said notches 20, it being understood that in order to procure this effect, the pawls are pivoted to opposite sides of the pivot point of the lever. At the outer end or corner of the sliding frame, there is pivoted a cam wire-gripping member 29 which coöperates with a shoulder 30 formed at the said portion of said sliding frame, it being understood that when in use, the wire is engaged between the cam wire-gripping member 13 and the shoulder 12 and another wire, which is to be spliced to the first mentioned wire, is engaged between the cam 29 and the shoulder 30, the lever 23 being then repeatedly oscillated so as to move the sliding frame in the direction of the lateral extension 11, there being sufficient space left between the wires and the rack bar 16 to permit of the manipulation of a splicing tool.

When the device is used in a position above the wire the pawls will automatically engage in the notches, but when the device is used in a position in the same horizontal plane as the wire or beneath the latter the right hand is used to operate the lever 23 while the left hand of the operator presses against the pawls 26 and 27 and engages them as the lever 23 is oscillated.

What is claimed is:—

A wire stretcher comprising a rack bar provided with a wire grip and having a longitudinal groove in each side; a frame slidably mounted on the rack bar, said frame comprising a pair of bars apertured to receive the rack bar, one of said bars extending laterally and the other diagonally with respect to said rack bar, said bars being connected at the ends remote from the rack bar and spaced from each other at opposite ends, a second pair of bars connecting the last mentioned bars at their spaced ends and working in the grooves of the rack bar; a wire grip carried by the aforesaid frame; a lever pivoted to the frame; and a pair of pawls pivoted to said lever and alternately engageable with said rack bar.

In testimony whereof, I affix my signature, in presence of two witnesses.

ADOLPH A. BOE.

Witnesses:
 E. E. WARFIELD,
 CHARLEY NELSON.